United States Patent Office 2,914,965
Patented Dec. 1, 1959

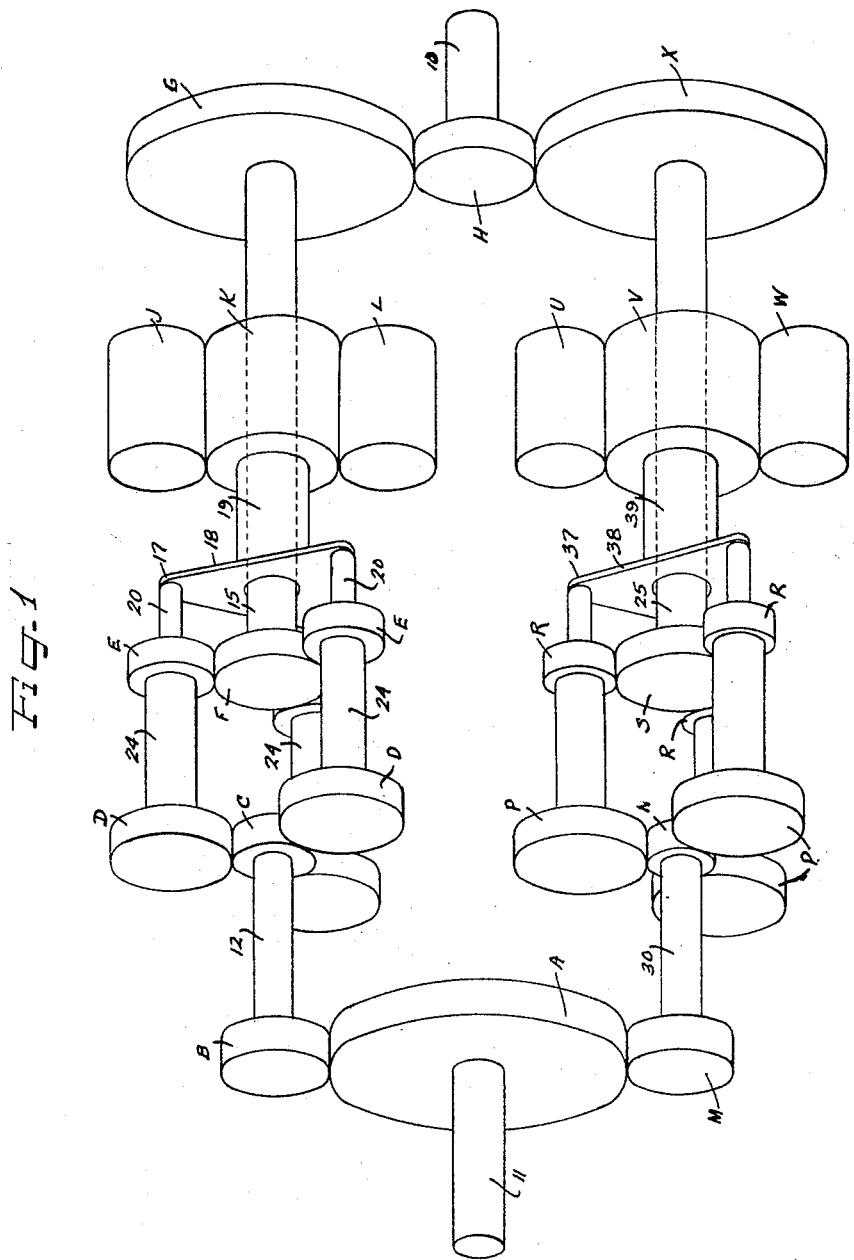

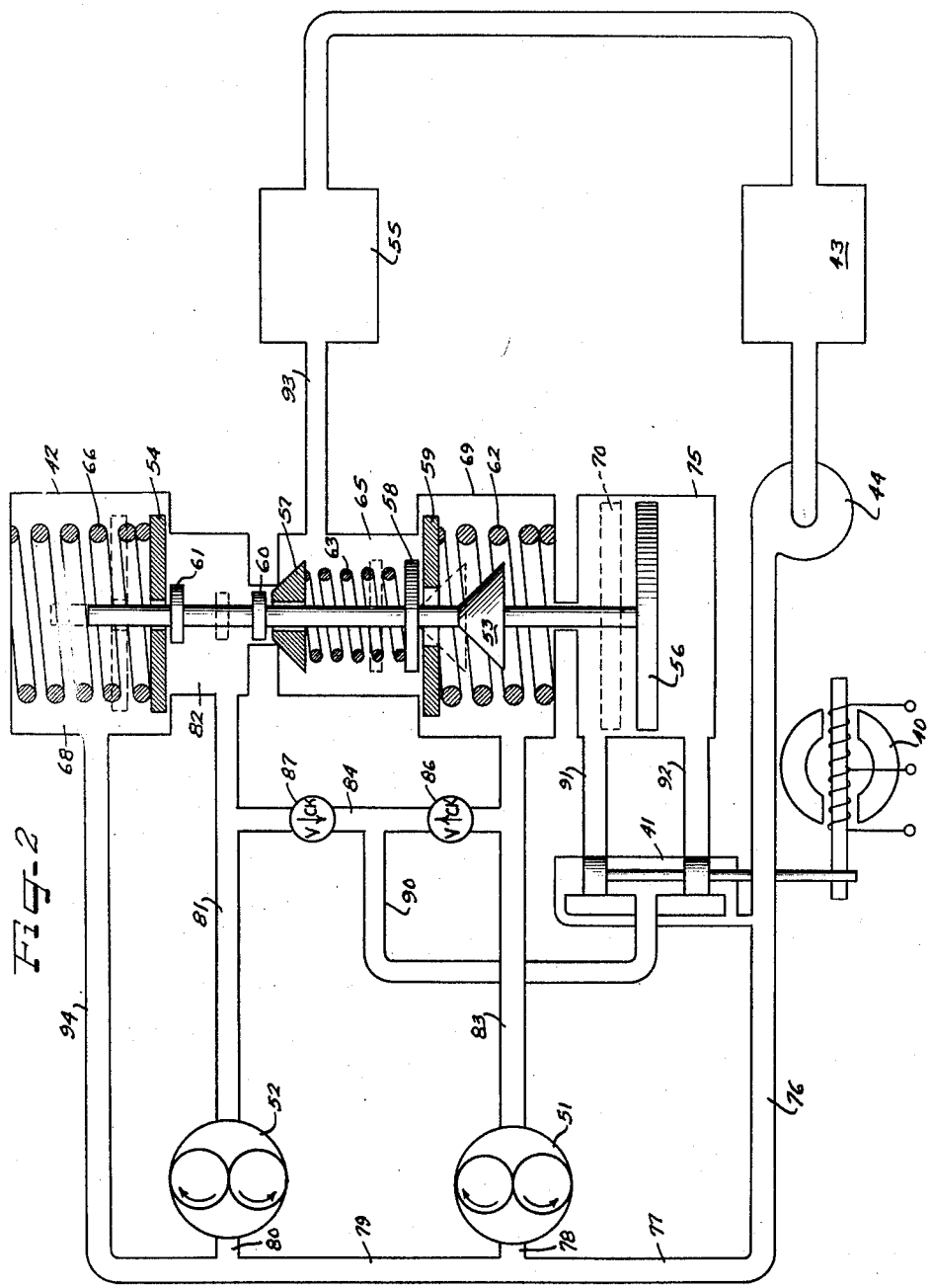

2,914,965

CONTROL SYSTEM FOR TRANSMISSION

Norman Matz, Cleveland Heights, Ohio, assignor to Thompson Products, Inc., Cleveland, Ohio, a corporation of Ohio Application June 6, 1957, Serial No. 664,132

12 Claims. (Cl. 74—687)

The transmission control system of this invention has general application to constant speed drives but, for the purpose of illustration, is described and shown herein as a system for use with a planetary gear drive to maintain the speed of the loading pumps such that they will keep an alternator at a predetermined speed under conditions of variable engine speed from idle to military rating. According to a preferred embodiment, the drive shaft may be connected to a jet engine and in conjunction with a transmission control system to effect the speed of an alternator. The differential gearing is such that when an engine is driven at variable speeds, the load shaft is driven at a constant speed, by changing the speed of rotating of spiders supporting planetary gears; the planetary gears being effected by two-stage hydraulic loading pumps with a novel control system for controlling the same.

In accordance with other features of this invention, the transmission control system as well as being extremely fast and efficient in response and stable in operation, can be very rugged and compact, easy and not critical to adjust and readily and economically manufactured from a minimum number of component parts, and can be made to embody the use of a booster pump combined therewith to prevent inlet cavitation of the hydraulic gear type loading pumps.

Accordingly, it is an object of this invention to provide compact and rugged control transmission which is efficient and fast in response, very stable in operation, easy to adjust, readily and economically manufactured and embodying suitable means to prevent inlet cavitation of the hydraulic loading pumps.

A further object of the invention is to provide a control system to maintain the speed of loading pumps such that they will control the speed of planetary gears associated therewith and in turn keep the driven shaft of the transmission at a predetermined, constant speed.

Other objects, features and advantages of the present invention will become fully apparent from the following detailed description taken in conjunction with the accompanying drawings which will illustrate a differential transmission and a control system for the transmission.

Figure 1 is a schematic layout of a planetary constant speed drive embodying the principles of the present invention.

Figure 2 is a schematic layout of the control system to maintain the speed of the loading pumps such that they will keep the driven shaft associated therewith at a predetermined, constant speed.

The transmission control system of this invention has general application but is herein illustrated and described as used to control the speed of an output or a driven shaft 10, Fig. 1, in relation to the variable speed of an input or rotation of a drive shaft 11.

The drive shaft 11 is driven by suitable means, such as a jet engine of variable speed not shown. Said shaft 11 has secured integrally therewith a gear, A, which drives a pinion gear, B, in the first speed stage and a pinion gear, M, in the second speed stage. Said pinion gear, B, is secured at the forward end of a shaft 12 having a sun gear C rigidly secured upon the opposite end thereof. A sun gear, F, is mounted upon the forward end of a shaft 15 having a gear, G, secured upon the opposite end thereof. Said gear, G, driving gear, H, secured to the forward end of the driven shaft 10 for driving an alternator at a constant speed, the alternator not shown.

The spider 17 is provided with a vertical flange portion 18 and a hollow spindle 19. Said spindle 19 is mounted to rotate on shaft 15 and is also keyed to gear, K, of the fluid type loading pump. Said gear, K, in turn drives gears, J, and, L, of the loading pump. Said spider 17 is shown with said flange portion 18 of triangular configuration rotatable about shaft 15. Each apex of said triangular flange portion 18 is provided with a horizontal shaft 20 arranged 120° apart. A planetary gear, E, is mounted on each of said shafts 20 adjacent the flange portion 18. Said gears, E, are in engagement with said sun gear, F, on said shaft 15. Each of the planetary gears, E, have hub extensions 24 extending outwardly therefrom for supporting a planetary gear, D, which will rotate therewith, the three planetary gears suitably mounted to be driven by the sun gear C which is rotated by shaft 12 and the gears, B, and A.

In the second stage, the parts may have different gear ratios. However, they are all of the same configuration and are assembled in the same manner as in the first stage. Gear, A, drives gear, M, which in turn rotates shaft 30 and sun gear, N. Said sun gear N driving the three planetary gears, P, and the three planetary gears, R, assembled therewith. Said planetary gears, R, are assembled in driving relation with the sun gear, S, mounted on the forward end of shaft 25 having a gear, X, secured on the opposite end thereof. Said gear, X, meshing with said gear, H, is secured to the forward end of shaft 10. Said planetary gears R are supported 120° apart and are assembled to a spider 37 having a vertical flange portion 38 and a hollow spindle 39. Said spindle 39 is mounted to rotate about shaft 25 and is keyed to gear, V, of the loading pump. Said gear, V, in turn drives gears, U, and, W, of the same loading pump.

Referring now to the loading pump control system shown by Fig. 2, the existing torque motor 40 which is a conventional unit that receives an electrical signal to indicate any deviation in the predetermined speed of shaft 10. That part of the control system that determines the speed error in shaft 10 and provides the electrical signal to the torque motor 40 is not shown as suitable means used in common practice will suffice. The torque motor 40 moves the shaft of the pilot valve 41 up or down depending on whether shaft 10 is too fast or too slow. The said pilot valve regulating the pressures on both sides of the piston of the loading pump discharge valve 42. Accordingly, the piston valve 41 effects the positions of the discharge valve 42 to maintain the speed of the loading pumps such that they will keep the alternator driven by shaft 10 at a predetermined constant speed. Subject matter relating to the loading pumps 51 and 52 and the pilot valve 41 is more fully disclosed in assignee's copending application Serial No. 663,946 filed June 6, 1957.

Fig. 1 of the drawings shows schematically how the gears in the planetary train of the first and second stages are driven. Each gear train includes input and output planetary gears mounted on a common shaft which in turn is retained in a spider. In the illustration, three sets of the planetary gears 120° apart are mounted on a common spider as shown, the spider of each stage driving a hydraulic pump. The spider shaft 19 in the first stage is connected to gear, K, of the loading pump, while the spider shaft 39 in the second stage is connected to gear, V, of the second loading pump. Said gear, K, effects the turning of gears, J, and, L, of the first pump, while gear, V, effects the turning of gears, U, and W, of the second pump. The spider in each stage is held stationary except for slippage when the loading pump driven by the spider is dead ended by closing the discharge valve of the pump associated therewith. The ratio of input to output speeds may be calculated from the gear ratios of the train of gears, A, through, H, of each stage. During the operation of the control system, when the spider is stationary it occurs with the lowest input speed for the correspondnig stage and maximum efficiency because the work put in the loading pump is a minimum. As the input speed increases, the output speed is maintained at the predetermined constant speed value by allowing the spider to rotate at desired speed. The spider is allowed to rotate by opening the discharge valve 42 of the loading pump. Therefore, the output speed of shaft 10 can be controlled at a constant value by regulating the discharge valve 42 to control the speed of the spiders 17 and 37.

The schematic Fig. 2 discloses an oil sump 43, connected with a booster pump 44 which supplies the oil to the low and high speed pumps in a manner to prevent inlet cavitation. The low speed pump 51 and high speed pump 52 are shown associated with a low speed valve 53 which also may be termed a low speed poppet or control valve and a high speed disk valve 54. A heat exchanger 55 is shown in direct communication with the oil sump 43. A cylinder 75 has a piston 56 arranged for vertical movement therein and having a piston rod attached therewith. Said rod has assembled thereon the low speed poppet valve 53, and flanges 58, 60 and 61. A spring 62 is vertically arranged around said piston rod to bias a low speed valve 59 which also may be termed a low speed bypass or control valve upwardly closing the upper outlet opening in chamber 69. A spring 63 is arranged around said piston rod and mounted vertically upon flange 58, to bias the high speed poppet valve 57 upwardly closing the upper outlet opening in chamber 65. A spring 66 is mounted in a chamber 68 and arranged to bias the high speed bypass valve 54 downwardly to close the lower outlet in said chamber 68. When the piston 56 moves upwardly to the position shown dotted by numeral 70, the low speed poppet valve 53 will move upwardly closing the opening in the low speed bypass valve 59; flange 58 moves upwardly against spring 63 causing the high speed valve 57 to move upwardly closing the opening thereabove; flange 61 moves upwardly forcing the high speed bypass valve upwardly against spring 66, all said positions shown dotted.

The booster pump 44 is in communication with the low speed stage gear pump by passaseways 76, 77 and 78; in communication with the high speed stage gear pump by passageways 76, 77, 79, and 80. There is a passageway 81 which connects the high speed pump 52 with chamber 82. There is a passageway 83 which connects the low speed pump 51 with chamber 69. Passageways 81 and 83 are interconnected by passageway 84 with two check valves 86 and 87 arranged therein. A passageway 90 is arranged between said check valves 86 and 87 and communicating with said pilot valve 41. Two passageways 91 and 92 connect the pilot valve with cylinder 75. There is a passageway 93 for connecting chamber 65 with the heat exchanger 55. A passageway 94 connects chamber 68 with passageways 79 and 80.

As stated above, Fig. 2 shows the existing torque motor which will control the pilot valve 41. The pilot valve 41 regulates the pressures on both sides of the piston 56 of the loading pump discharge valve. Accordingly, the piston positions the discharge valve to maintain the speed of the loading pumps such that they will keep the driven shaft 10 at a constant predetermined speed. From the above, it will be noted that oil is taken from the sump 43 and forced by the booster pump 44 to pumps 51 and 52. The low stage pump 51 is dead ended at idle speed of the driven shaft 10, and with the low speed poppet valve 53 closed. The high speed stage pump 52 is free and open since high speed bypass valve 54 is raised to open dotted position. As the speed of shaft 11 increases, the low speed poppet valve 53 starts to move downwardly whereby the fluid will pass from chambers 69 and 65 to heat exchanger 55 and back to the sump 43. Valves 53 and 57 control the amount of fluid by-pass from gear pumps 51 and 52 respectively in the following manner. As piston 56 starts at the top and moves down, first, pump 52 is simply circulating fluid through wide open valve 54. Pump 52 corresponds to the loading pump K in Figure 1 and since this pump can be rotated freely, no torque can be delivered to the upper planetary system of Figure 1. However, at this time when piston 56 is at the top of its stroke, valves 59 and 53 are closed which dead ends the pump 51 which corresponds to loading pump V in Figure 1. This means that pump V is essentially restricted from rotation and spider 37 connected to it must also be restricted from rotation. Therefore, torque can be delivered thru the lower planetary system of Figure 1. Now, as piston 56 moves downward, valve 54 remains open since it is a comparatively large area with low stroke valve, while valve 53 travels thru its operating range of control. Therefore, varying the opening of valve 53 permits pump 51 to pump varying amounts of fluid which means that pump 51 must rotate at varying speeds. As piston 56 moves downward, the area of vale 53 increases and pump 51 speed increases to pump more fluid. Therefore in Figure 1, loading pump V is allowed to increase in speed changing the speed relationship between input shaft 11 and output shaft 10. If output shaft 10 speed tends to increase above its predetermined value than an increase in permissable speed of the loading pump V as described above will lower shaft speed 10 toward its predetermined value. Now further, as piston 56 continues to move downward, a transition point is reached where valve 59 is opened by flange 58 and valve 54 is allowed to close by moving flange 61 down away from contact with valve 54 and at the same time flange 60 starts to open valve 57. Functionally, this means that pump 51 is unrestricted in being allowed to pump freely through opened valve 59 and pump 52 is controlled by the amount of opening of valve 57. This means that spider 37 now rotates freely and spider 17 is restricted. Therefore torque delivery is transferred from the lower planetary system of Figure 1 to the upper planetary system which are similar except for gear ratios. The speed ratio between shafts 11 and 10 now depends on the amount of rotation of spider 17 or loading pump K which corresponds to pump 52. The speed of pump 52 is permitted to increase as valve 57 opening is increased or as piston 56 is moved downward. Therefore, by the above analysis, it is shown that shaft 10 can be kept at a constant speed while shaft 11 increases speed providing piston 56 is forced downward causing the loading pumps V or K connected with spiders 37 and 17 respectively to increase speed. With different gear ratios the two planetary systems in Figure 1 covers different ranges of speed ratios between shafts 11 and 10 and the transition between these two planetary systems is described above. If shaft 11 speed is decreased, the reverse of the above procedure will be followed as piston 56 moves upward.

The above valve system is for regulating fluid flow through each of the pumps 51 and 52 effective to vary resistance on the drive unit for varying the driving and driven ratios of each of the differential units shown by Figs. 1 and 2. The differential units being incapable of delivering power until some resistance is placed upon the fluid flow from the pump driven by one of the units. The valve system is capable of first restricting flow in one pump from free flow to no flow as the ratio in input and output shaft speeds vary and then successively restricting flow in the second pump when the flow in said first pump is stopped, whereby each differential unit will successively operate from a substantially full power transmission drive when the loading pump is dead ended to its full driving ratio change before the next unit becomes effective as a drive due to a slight slippage of the hydraulic loading pump.

The operating cycle whereby one unit can function alone or in combination with another unit is clearly shown by the following data with reference to Fig. 2 of the drawing:

Cycle (a)—Pump 51 is dead ended (dotted positions); pump 52 is wide open (dotted lines).
Cycle (b)—Operation on pump 51 (valve between solid and dotted positions).
Transition (c)—Pump 52 dead ended: Valve 53 opens; valve 59 starts to open; valve 54 just closing; valve 57 closed and starting to open.
Operation (d)—Pumps 51 and 52 dead ended; valve 59 is wide open; valve 54 closed; valve 57 modulatory.

The transition from the first stage to the second stage actually will not occur at a fixed engine pad speed. The transition will be gradual over a relatively small band of input speed change. During the transition, there will be a partial load on each of the two stages and this will be controlled by the discharge throttling valve of the loading pumps. Also, sudden acceleration or deceleration of the components in each of the stages will not occur since all of the gears and loading pumps are always engaged and running at corresponding relative speeds determined only by the ratio of output to input speeds.

From the above description a novel invention is provided which will maintain the speed of loading pumps such that they will control the speed of planetary gears associated therewith and in turn keep the driven shaft of the transmission at a predetermined, constant speed.

Although various minor modifications to the preferred structural embodiments herein described may be suggested by persons skilled in the art, I wish to embody within the scope of this patent all such modifications as reasonably and properly come within the scope of my contribution to the art.

I claim as my invention:

1. A control system for use with a multi-stage mechanical drive for transmitting power, comprising an input shaft, an output shaft, a plurality of differential units arranged in parallel and coupling said input and output shafts together, each unit having a fluid pump assembled therewith and driven thereby with the pumps connected to the free element of the differential and with the resistance of the pump controlling the speed ratio through the differential unit from said input to said output shaft; the flow of fluid to and from said pumps being controlled by a pilot valve suitably governed, said pilot valve regulating the pressure upon a piston in a loading pump discharge valve unit, the movement of said piston effecting movement of a plurality of low speed and high speed control valves, and the movement of said valves restricting the flow of fluid in one pump from free flow to no flow as the ratio of input and output shaft speeds vary and then successively restricting flow in another pump when the flow in said one pump is stopped whereby each differential unit will successively operate from a minimum drive ratio change to its full drive ratio change before the next unit becomes effective as a drive.

2. A control system for use with a two-stage mechanical drive comprising an input shaft, an output shaft, a plurality of differential units arranged in parallel and coupling said input and output shafts together for transmission of power, said drive having a fluid pump for each unit and driven by the unit with said pumps connected to the free element of said differential units and the resistance of the pumps controlling the speed ratio through the differentials of the input to the output shaft; said control system regulating flow of fluid through each pump effective to vary resistance on the drive unit for varying the driving and driven ratios of each unit, the flow of fluid to and through said pumps being controlled by a pilot valve governed by a suitable torque motor, said pilot valve regulating the pressure on both sides of a piston in the loading pump discharge valve unit, and the movement of said piston effecting movement of a low speed valve, a low speed by pass valve, a high speed valve and a high speed by pass valve to maintain the speed of the loading pumps such that they will keep the driven shaft at a predetermined speed.

3. A control mechanism for a multi-stage mechanical drive embodying a plurality of differential units connected in parallel to deliver power to a driven shaft in combination with hydraulic control pumps connected to load the the free element of the differential drives to maintain the driven shaft at a constant speed, comprising a flow-control member shiftable between two positions and an intermediate position in a flow-control cylinder, a piston arranged in a piston chamber, passageways in communication with both of said chambers to direct fluid pressure on the opposite sides of said piston, a piston rod assembled with said piston, a pair of gear pump, a low speed valve connected to said piston rod and connected to control the discharge of one of said pumps, a high speed valve slidably mounted on said piston rod and connected to control the discharge of the other of said pumps, a plurality of means secured to said piston rod effecting movement of said valves, a plurality of means to bias said high speed valve and said low speed bypass valve toward closing position, and a pilot valve governed by suitable means to vary fluid pressure on the opposite sides of said piston, whereby the movement of said piston rod effects movement of said valves restricting flow of fluid to said pumps, restricting the flow of fluid in one pump from free flow to no flow as the ratio of drive and driven shaft speeds vary and then successively restricting flow in another pump when the flow in said one pump is stopped whereby each different unit will successively operate from a minimum ratio change to its full drive ratio change before the next unit becomes effective as a drive.

4. A control device for a multi-stage mechanical drive embodying an input shaft and an output shaft and a plurality of differential units connected in parallel to the output shaft and to the input shaft in combination with hydraulic fluid control pumps and having a flow-control member shiftable to control pressures on the opposite sides of a piston controlling the loading of separate pump discharge control valves, comprising a piston arranged within a piston chamber, passageways in communication with the opposite sides of the piston in said chamber, a plurality of low and high pressure gear pumps, a plurality of chambers in communication with said low and high speed gear pumps, a plurality of valves for effecting flow of fluid to said gear pumps, a rod rigidly secured to said piston and effecting directly or indirectly the movement of said valves, a pilot valve governed by suitable means to shift fluid pressure to the opposite sides of said piston, whereby the movement of said valves restrict flow of fluid in one pump from free flow to no flow as the ratio of input and output shaft speeds vary and then successively restrict flow in another pump when the flow in said one pump is stopped whereby each different unit will successively operate from a minimum ratio change to a full drive ratio change before the next unit becomes effective as a drive.

5. In a control system for a two-speed stage transmission, said transmission embodying a drive shaft, a driven shaft, a pair of planetary gear drives arranged in parallel for driving the driven shaft at a constant speed; a pair of loading pumps, each of said planetary gear drives having its free element in driving connection with one of said loading pumps and with the other elements connected to the drive and driven shafts respectively, each of said loading pumps embodying a three-gear unit, the speed of said free element in each combination being controlled by the flow of fluid allowed to pass through the pumps; the flow of fluid to and through said pair of pumps being controlled by a pilot valve which is itself controlled by a suitable torque motor, said pilot valve regulating the pressure on both sides of a piston in the loading pump discharge valve, the relative positions of the piston in the discharge valve effecting the position of the low speed valve, a low speed bypass valve, a high speed valve, and a high speed bypass valve to maintain the speed of the loading pumps such that they will keep the driven shaft at a predetermined constant speed.

6. The control system for a mechanical drive described in claim 2 and in which the speed ratio between the input shaft and output shaft is in two stages, the transition from the first stage to the second stage being gradual over a relatively small range of input speed change.

7. The control system for a mechanical drive described in claim 6 and in which during the transition from the first stage to the second stage there will be a partial load on each of the two differential units and this will be controlled by the valves of the loading pumps.

8. A mechanism for transmitting power comprising a driven shaft, a drive shaft, a first planetary gear train connected between the drive shaft and the driven shaft, a second planetary gear train connected in parallel to said first train and connected between said drive shaft and said driven shaft and having a different gear ratio than said first train, each of said planetary trains having a first gear element connected to the drive shaft, a second gear element connected to the driven shaft and a third gear element, the power transmitted from said first to said second gear element varying as a function of the rotational resistance placed on said third gear element, first and second fluid pumps connected to said third gear elements of said first and second gear trains respectively to impose a resistance to rotation, a control valve unit for sequentially and incrementally restricting or increasing flow from said first and second pumps to increase or decrease the pump load and consequently the speed of the output shaft, said valve unit including a first control valve controlling the flow from said first pump and a second flow control valve controlling the flow from said second pump, and means connected to said valve unit gradually closing said first valve and sequentially gradually closing said second valve after said first valve is closed.

9. A mechanism for transmitting power comprising a driven shaft, a drive shaft, a first planetary gear train connected between the drive shaft and the driven shaft, a second planetary gear train connected in parallel to said first train and connected between said drive shaft and said driven shaft and having a different gear ratio than said first train, each of said planetary trains having a first gear element connected to the drive shaft, a second gear element connected to the driven shaft and a third gear element, the power transmitted from said first to said second gear element varying as a function of the rotational resistance placed on said third gear element, first and second fluid pumps connected to said third gear elements of said first and second gear trains respectively to impose a resistance to rotation, and means connected to restrict the outputs of said pumps and operative to first restrict flow in the first pump from free flow to no flow and then successively restrict flow in the second pump when the flow in the first pump is stopped whereby each planetary train will successively operate from a maximum ratio change to a minimum ratio change before the other train becomes effective as a drive.

10. A mechanism for transmitting power comprising a driven shaft, a drive shaft, a first planetary gear train connected between the drive shaft and the driven shaft, a second planetary gear train connected in parallel to said first train and connected between said drive shaft and said driven shaft and having a lower drive shaft gear ratio than said first train, each of said planetary trains having a first gear element connected to the drive shaft, a second gear element connected to the driven shaft and a third gear element, the power transmitted from said first to said second gear element varying as a function of the rotational resistance placed on said third gear element, first and second fluid pumps connected to said third gear elements of said first and second gear trains respectively to impose a resistance to rotation, a control valve unit having a first valve connected to control the discharge of the first pump and a second valve connected to control the discharge of the second pump for sequentially and incrementally restricting or increasing flow from said first and second pumps to increase or decrease the pump load and consequently the speed of the driven shaft, and means responsive to speed change connected to said driven shaft and connected to said valve unit and sequentially and gradually closing said first valve and then gradually closing said second valve as the speed of the driven shaft decreases, and gradually opening said second valve and then gradually opening said first valve after said second valve is open as the speed of the driven shaft increases to maintain a constant driven shaft speed.

11. In a drive having parallel planetary trains of different gear ratios and separate fluid pumps to control the resistance to operation of the planetary gears, a valve control mechanism comprising a first control valve and a first by-pass valve to be connected to the output of a first pump, a second control valve and a second by-pass valve connected to control the output of said second pump, and means connected to operate said valves and sequentially gradually opening said first control valve, closing said second by-pass valve and opening said first by-pass valve simultaneously with full opening of said first control valve, and subsequently gradually opening said second control valve.

12. A valve control mechanism in accordance with claim 11 including means responsive to speed change and adapted to be connected to the driven shaft and connected to said valve operating means for speed regulation.

References Cited in the file of this patent

UNITED STATES PATENTS

| | | |
|---|---|---|
| 1,873,200 | Hedstrom | Aug. 23, 1932 |
| 2,181,118 | Burner | Nov. 28, 1939 |
| 2,285,431 | Grossenbacher | June 9, 1942 |
| 2,286,485 | Hild | June 16, 1942 |
| 2,455,070 | Lawrence | Nov. 30, 1948 |
| 2,517,188 | Feng | Aug. 1, 1950 |
| 2,653,487 | Martin et al. | Sept. 29, 1953 |
| 2,808,737 | Bullard | Oct. 8, 1957 |

FOREIGN PATENTS

| | | |
|---|---|---|
| 535,075 | Great Britain | Mar. 27, 1941 |